UNITED STATES PATENT OFFICE.

CONRAD E. SELSS, OF BROOKLYN, NEW YORK.

IMPROVEMENT IN OIL COMPOUNDS FOR HARNESS AND AXLES.

Specification forming part of Letters Patent No. 155,206, dated September 22, 1874; application filed March 16, 1874.

*To all whom it may concern:*

Be it known that I, CONRAD E. SELSS, of Brooklyn, Kings county, New York, have invented an Improved Compound Axle and Harness Oil, and the following is a specification thereof.

My invention consists in the combination, in suitable proportions, of castor oil, cotton-seed oil, plumbago and lampblack, with or without a proportion of paraffine oil.

The manner of making or compounding my improved axle and harness oil is as follows: Take sixteen pounds of best plumbago, one pound of good lampblack, a quantity of castor oil equal by weight to the plumbago, and a similar quantity of cotton-seed oil. The lampblack and plumbago are first thoroughly commingled in a dry powdered state. The castor oil is then added and the whole incorporated by passing the mass or body through a mill or other suitable mixer. The cotton-seed oil is then stirred in and the mixture afterward allowed to stand for about twenty-four hours, more or less, to permit a portion of the powdered substance aforesaid to be precipitated. If the ingredients have been well incorporated with each other, the liquid will be found to hold suspended a proportion of the plumbago and lampblack. The oil thus freighted may be drawn off and put up for use, and the sediment which remains is re-used with a fresh supply for another batch.

I do not wish to limit myself to the precise proportions of the ingredients named, but

I claim as my invention—

For an axle and harness oil, the several ingredients specified, combined in about the proportions mentioned, substantially as described.

C. E. SELSS.

Witnesses:
    EARLE H. SMITH,
    G. EMMERMANN.